United States Patent
An et al.

(10) Patent No.: US 11,725,680 B2
(45) Date of Patent: Aug. 15, 2023

(54) ADJUSTING MECHANISM OF BOX AND LED BOX ASSEMBLY

(71) Applicant: LEYARD OPTOELECTRONIC CO., LTD., Beijing (CN)

(72) Inventors: Guoliang An, Beijing (CN); Zhiyong Liu, Beijing (CN)

(73) Assignee: LEYARD OPTOELECTRONIC CO., LTD., Beijing (CN)

( * ) Notice: Subject to any disclaimer, the term of this patent is extended or adjusted under 35 U.S.C. 154(b) by 0 days.

(21) Appl. No.: 17/728,746

(22) Filed: Apr. 25, 2022

(65) Prior Publication Data
US 2022/0341446 A1  Oct. 27, 2022

(30) Foreign Application Priority Data
Apr. 25, 2021 (CN) .......................... 202110449268.3

(51) Int. Cl.
*G09F 9/302* (2006.01)
*F16B 5/00* (2006.01)

(52) U.S. Cl.
CPC .......... *F16B 5/0092* (2013.01); *G09F 9/3026* (2013.01)

(58) Field of Classification Search
CPC ........ F16B 5/0092; G09F 9/3026; G09F 9/33; G09F 19/226; F16M 11/043; F16M 13/02; G02F 1/13336
See application file for complete search history.

(56) References Cited

U.S. PATENT DOCUMENTS

| | | | | |
|---|---|---|---|---|
| 2003/0217495 A1* | 11/2003 | Nagamine | ................. | G09F 9/33 40/605 |
| 2009/0065667 A1* | 3/2009 | Bakkom | ................ | F16M 13/02 16/221 |
| 2011/0228504 A1* | 9/2011 | Mitsuhashi | ............ | F16M 13/02 361/807 |

(Continued)

FOREIGN PATENT DOCUMENTS

| CN | 202549188 U | 11/2012 |
|---|---|---|
| CN | 104902716 A | 9/2015 |

(Continued)

OTHER PUBLICATIONS

The extended European search report of the corresponding EP patent application No. 22169594.3, dated Sep. 21, 2022.

*Primary Examiner* — Richard J Hong
(74) *Attorney, Agent, or Firm* — Gang Yu (57) ABSTRACT

An adjusting mechanism of a box and a light emitting diode (LED) box assembly are provided. The adjusting mechanism of a box includes: a first adjusting structure which includes a first base, a rotating member, an adjusting lock hook movably arranged on the rotating member and a driving member arranged in the rotating member and driving the adjusting lock hook to move, where the rotating member can drive the adjusting lock hook to rotate when rotating such that the adjusting lock hook has a locking position and an unlocking position; and a second adjusting structure which includes a second base and an adjusting rod, where the adjusting lock hook is in the locking position when the adjusting lock hook cooperates with the adjusting rod, and the adjusting lock hook is in the unlocking position when the adjusting lock hook is separated from the adjusting rod.

18 Claims, 9 Drawing Sheets

(56) References Cited

U.S. PATENT DOCUMENTS

2018/0130389 A1* 5/2018 Shibata ................ G09F 19/226
2020/0057594 A1* 2/2020 Nakano ................ G09F 9/3026
2020/0103068 A1* 4/2020 Ahn .................... F16M 11/043
2020/0201590 A1* 6/2020 Lim .................... G02F 1/13336

FOREIGN PATENT DOCUMENTS

EP          1365376 B1   11/2005
KR        101278911 B1    6/2013

* cited by examiner

ADJUSTING MECHANISM OF BOX AND LED BOX ASSEMBLY

CROSS-REFERENCE TO RELATED APPLICATION

This application claims the priority to Chinese patent application No. 202110449268.3, filed to the China National Intellectual Property Administration on Apr. 25, 2021, the disclosure of which is hereby incorporated by reference in its entirety.

TECHNICAL FIELD

The disclosure relates to a technical field of light emitting diode (LED) display, and particularly relates to an adjusting mechanism of a box and an LED box assembly.

BACKGROUND

A light emitting diode (LED) display screen is composed of a box assembly assembled from a plurality of boxes and a display screen body arranged on the box assembly. During field installation, since the bottoms of the boxes to be assembled are deformed seriously, there is a height difference and a gap between two adjacent boxes, which severely affects the display quality of the LED display screen.

The related art provides a horizontal adjusting mechanism fora bottom of an LED display screen. The mechanism includes a box, an adjusting screw rod, an upper sliding block and a lower sliding block; a bottom surface of the box is provided with an accommodating cavity, the upper sliding block and the lower sliding block are arranged in the accommodating cavity, and the upper sliding block is slidably arranged on the lower sliding block; and a threaded hole penetrates the upper sliding block in a front-back direction, and the adjusting screw rod penetrates a surface of the box to be inserted into the threaded hole, such that the adjusting screw rod is in threaded connection to the upper sliding block. The adjusting screw rod is rotated to move the upper sliding block forward and backward, so as to drive the lower sliding block to move up and down, and further a bottom of the lower sliding block retracts into or extends out of the accommodating cavity.

In the above structure, by rotating the adjusting screw rod, the lower sliding block moves up and down, such that the bottom of the lower sliding block retracts into or extends out of the accommodating cavity, and further the box is lifted up. However, by means of the above mechanism, only a gap between adjacent boxes can be adjusted, which makes a function relatively single.

SUMMARY

The main objective of the disclosure is to provide an adjusting mechanism of a box and a light emitting diode (LED) box assembly, so as to solve the problem that in the related art, only a gap between adjacent boxes may be adjusted, which makes a function relatively single.

In order to realize the above objective, one aspect of the disclosure provides an adjusting mechanism of a box. The mechanism includes a first adjusting structure which includes a first base, a rotating member arranged on the first base, an adjusting lock hook movably arranged on the rotating member and a driving member arranged in the rotating member and driving the adjusting lock hook to move, wherein the rotating member may drive the adjusting lock hook to rotate when rotating such that the adjusting lock hook has a locking position and an unlocking position. The mechanism further includes a second adjusting structure which includes a second base and an adjusting rod movably arranged in the second base, wherein the adjusting lock hook is in the locking position when the adjusting lock hook cooperates with the adjusting rod, and the adjusting lock hook is in the unlocking position when the adjusting lock hook is separated from the adjusting rod.

In some embodiments, a moving direction of the adjusting lock hook is perpendicular to an axis of the rotating member, a moving direction of the adjusting rod is parallel to the axis of the rotating member; the driving member includes a driving block and a driving rod, the rotating member is internally provided with a guide groove, the driving block is movably arranged in the guide groove along the axis of the rotating member, the driving rod penetrates the rotating member and drives, in a rotating manner, the driving block to move, and an axis of the driving rod is perpendicular to a moving direction of the adjusting lock hook.

In some embodiments, the driving block is provided with a strip-shaped adjusting hole, the adjusting lock hook is provided with a connecting column penetrating the strip-shaped adjusting hole, and the strip-shaped adjusting hole is inclined relative to the moving direction of the adjusting lock hook.

In some embodiments, the first base is provided with a first mounting hole and a first avoiding groove in communication with the first mounting hole, the rotating member is arranged in the first mounting hole, a side wall of the rotating member is further provided with a guide hole in communication with the guide groove, the driving block is internally provided with a second avoiding groove in communication with the guide hole, and a part of the adjusting lock hook penetrates the second avoiding groove, the guide hole and the first avoiding groove.

In some embodiments, the first adjusting structure further includes an operating plate connected with an end of the rotating member, the operating plate is provided with a first operating hole, and a second operating hole is provided in an end, corresponding to the first operating hole, of the driving rod.

In some embodiments, the rotating member is further provided with a limiting hole in communication with the guide groove, the driving rod includes a connecting section positioned in the guide groove and connected with the driving block and an operating section connected with the connecting section, a wall of the limiting hole is provided with a limiting protrusion, the operating section is positioned in the limiting hole and cooperates with the limiting protrusion in a limited manner, and the second operating hole is arranged on the operating section; a diameter of the second operating hole is smaller than a diameter of the first operating hole.

In some embodiments, the adjusting mechanism of a box further includes a cover plate covering the first base, and the cover plate is provided with a first avoiding hole in communication with the first operating hole.

In some embodiments, the adjusting lock hook includes a driving section and a lock hook section connected with the driving section, where the driving section penetrates the driving member, the rotating member and the first base, and the lock hook section is positioned outside the first base. The adjusting rod includes a rod body and a lock groove provided on the rod body, where the adjusting lock hook is in the locking position when the lock hook section cooperates with the lock groove, and the adjusting lock hook is in the unlocking position when the lock hook section is separated from the lock groove.

In some embodiments, the second base is provided with a second mounting hole and a third avoiding groove, the adjusting rod is arranged in the second mounting hole, the lock groove is arranged in the third avoiding groove, and the third avoiding groove avoids the lock hook section.

Another aspect of the disclosure provides an LED box assembly. The assembly includes a plurality of boxes and the adjusting mechanisms of boxes is the above adjusting mechanism of a box above mentioned.

In some embodiments, the plurality of boxes are sequentially spliced, and a plurality of adjusting mechanisms of boxes are arranged. One box of two boxes spliced left and right is a first box, the other one is a second box, and/or one box of two boxes spliced up and down is a third box, and the other one is a fourth box, where each of the first box, the second box, the third box and the fourth box includes a first side portion, a second side portion, a third side portion and a fourth side portion which are sequentially connected. The third side portion of the first box is connected with the first side portion of the second box by one adjusting mechanism of a box, the third side portion of the first box is provided with a second avoiding hole for avoiding the adjusting lock hook of the adjusting mechanism of a box, and the first side portion of the second box is provided with a third avoiding hole for avoiding the adjusting lock hook of the adjusting mechanism of a box. The second side portion of the third box is connected with the fourth side portion of the fourth box by means of another adjusting mechanism of a box, the second side portion of the third box is provided with a fourth avoiding hole for avoiding the adjusting lock hook of the adjusting mechanism of a box, and the fourth side portion of the fourth box is provided with a fifth avoiding hole for avoiding the adjusting lock hook of the adjusting mechanism of a box.

By using the technical solution of the disclosure, the adjusting mechanism of a box includes the first adjusting structure and the second adjusting structure. The first adjusting structure includes the first base, the rotating member arranged on the first base, the adjusting lock hook movably arranged on the rotating member and the driving member arranged in the rotating member and driving the adjusting lock hook to move. The rotating member drives the adjusting lock hook to rotate when rotating such that the adjusting lock hook has the locking position and the unlocking position. The second adjusting structure includes the second base and the adjusting rod arranged in the second base, where the adjusting lock hook is in the locking position when the adjusting lock hook cooperates with the adjusting rod, and the adjusting lock hook is in the unlocking position when the adjusting lock hook is separated from the adjusting rod. The first adjusting structure is arranged on one of the two adjacent boxes and the second adjusting structure is arranged on the other one of the two adjacent boxes. In the disclosure, when the adjusting lock hook is in the locking position, the driving member moves to drive the adjusting lock hook to move in a direction perpendicular to an axis of the adjusting rod, so as to adjust a distance between the first adjusting structure and the second adjusting structure, thereby adjusting a gap between the two adjacent boxes. The adjusting rod rotates to push the adjusting lock hook to move in an axial direction of the adjusting rod, so as to adjust the distance between the first adjusting structure and the second adjusting structure, thereby adjusting a height difference between the two adjacent boxes. In this way, by means of one adjusting mechanism of a box, the gap between the two adjacent boxes may be adjusted, and the height difference between the two boxes may also be adjusted, which makes functions diverse. Thus, the technical solution of the disclosure may solves the problem that in the related art, only a gap between adjacent boxes may be adjusted, which makes a function relatively single.

BRIEF DESCRIPTION OF THE DRAWINGS

The accompanying drawings, forming part of the disclosure, of the description serve to provide a further understanding of the disclosure, and illustrative embodiments of the disclosure and the description of the illustrative embodiments serve to explain the disclosure and are not to be construed as unduly limiting the disclosure. In the accompanying drawings.

The above accompanying drawings include the following reference numerals:

10: first adjusting structure, 11: first base, 111: first mounting hole, 112: first avoiding groove, 113: positioning recess, 12: rotating member, 121: guide groove, 122: limiting hole, 123: limiting protrusion, 124: guide hole, 125: positioning protrusion, 13: driving member, 131: driving block, 1311: adjusting hole, 1312: second avoiding groove, 132: driving rod, 1321: connecting section, 1322: operating section, 1323: second operating hole, 14: adjusting lock hook, 141: driving section, 142: lock hook section, 143: connecting column, 151: first operating hole, 15: operating plate, 16: cover plate, 161: first avoiding hole, 20: second adjusting structure, 21: second base, 211: second mounting hole, 212: third avoiding groove, 22: adjusting rod, 221: rod body, 222: lock groove, 30: box, 31: first side portion, 32: second side portion, 33: third side portion, 34: fourth side portion, 35: second avoiding hole and 36: third avoiding hole.

DETAILED DESCRIPTION OF THE EMBODIMENTS

The technical solutions of the embodiments of the disclosure will be clearly and completely described below with reference to the accompanying drawings of the embodiments of the disclosure. Apparently, the embodiments described are merely part rather than all of the embodiments of the disclosure. The following description of at least one illustrative embodiment is merely illustrative in nature and in no way serves as any limitation of the disclosure and its application or uses. On the basis of the embodiments of the disclosure, all other embodiments obtained by those of ordinary skill in the art without making inventive efforts should fall within the protection scope of the disclosure.

It should be noted that the terms used herein are merely for describing the specific implementations and are not intended to limit the illustrative implementations according to the disclosure. As used herein, singular is also intended to include plural unless the context clearly points out singular or plural. In addition, it should be understood that terms "include" and/or "comprise" used in the description indicate the presence of features, steps, operations, devices, components and/or combinations of the foregoing.

Unless specifically stated otherwise, relative arrangements, numerical expressions and values of the components and steps stated in these embodiments do not limit the scope of the disclosure. At the same time, it should be understood that the sizes of the various portions shown in the accompanying drawings are not drawn according to an actual scale for ease of description. Technique, methods and equipment known to those of ordinary skill in the related art may not be discussed in detail, but should be considered as part of the authorized description where appropriate. In all examples shown and discussed herein, any particular value should be interpreted as illustrative only and not as limiting. Thus, other examples of the illustrative embodiments may have different values. It should be noted that similar numerals and letters denote similar items in the following accompanying drawings, and therefore, once an item is defined in one figure, it does not need to be further discussed in the subsequent figures.

Figure 14:
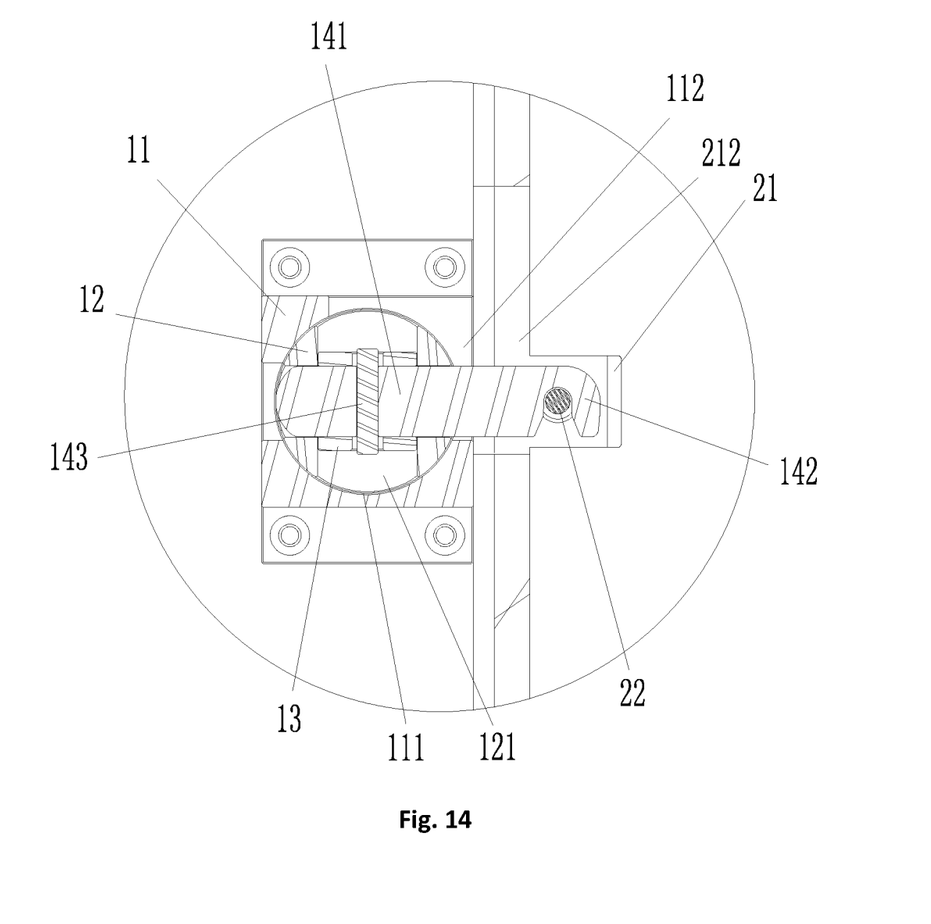
FIG. 14 shows an enlarged structural schematic diagram of portion B of the LED box assembly in FIG. 13.
Figure 15:
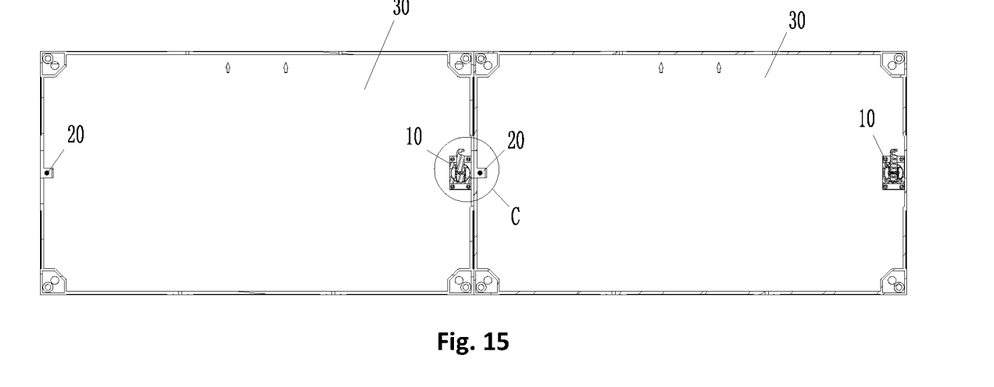
FIG. 15 shows a sectional schematic diagram in a left-right direction in the case where the adjusting lock hook of the LED box assembly in FIG. 10 is in an unlocking position.
Figure 16:
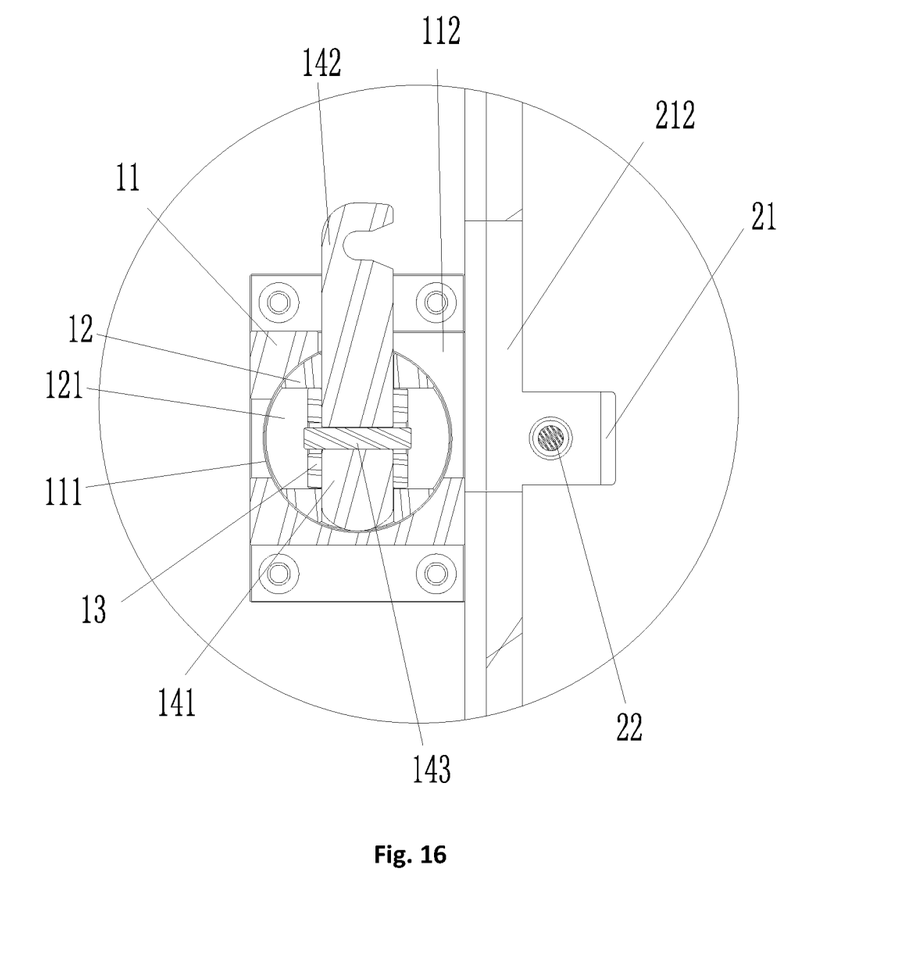
FIG. 16 shows an enlarged structural schematic diagram of portion C of the LED box assembly in FIG. 15.

As shown in FIGS. 1-12, an adjusting mechanism of a box includes a first adjusting structure 10 and a second adjusting structure 20. The first adjusting structure 10 includes a first base 11, a rotating member 12 arranged on the first base 11, an adjusting lock hook 14 movably arranged on the rotating member 12 and a driving member 13 arranged in the rotating member 12 and driving the adjusting lock hook 14 to move. The rotating member 12 drives the adjusting lock hook 14 to rotate when rotating, such that the adjusting lock hook 14 has a locking position and an unlocking position. The second adjusting structure 20 includes a second base 21 and an adjusting rod 22 movably arranged in the second base 21, where the adjusting lock hook 14 is in the locking position (shown in FIG. 14) when the adjusting lock hook 14 cooperates with the adjusting rod 22, and the adjusting lock hook 14 is in the unlocking position (shown in FIG. 16) when the adjusting lock hook 14 is separated from the adjusting rod 22.

By using the technical solution of the embodiment, the rotating member 12 drives the adjusting lock hook 14 to rotate when rotating, such that the adjusting lock hook 14 has the locking position and the unlocking position. The adjusting lock hook 14 is in the locking position when the adjusting lock hook 14 cooperates with the adjusting rod 22, and the adjusting lock hook 14 is in the unlocking position when the adjusting lock hook 14 is separated from the adjusting rod 22. The first adjusting structure 10 is arranged on one of the two adjacent boxes and the second adjusting structure 20 is arranged on the other one of the two adjacent boxes. In the embodiment, when the adjusting lock hook 14 is in the locking position, the driving member 13 moves to drive the adjusting lock hook 14 to move in a direction perpendicular to an axis of the adjusting rod 22, so as to adjust a distance between the first adjusting structure 10 and the second adjusting structure 20, and further a gap between the two adjacent boxes may be adjusted. The adjusting rod 22 rotates to push the adjusting lock hook 14 to move in an axial direction of the adjusting rod 22, so as to adjust the distance between the first adjusting structure 10 and the second adjusting structure 20, and further a height difference between the two adjacent boxes may be adjusted. In this way, by one adjusting mechanism of a box, the gap between the two adjacent boxes may be adjusted, and the height difference between the two boxes may also be adjusted, which makes functions diverse, operation simpler and more convenient and work efficiency higher. Thus, the technical solution of the embodiment may solve the problem that in the related art, only a gap between adjacent boxes may be adjusted, which makes a function relatively single.

It should be noted that in the case where the two adjacent boxes are arranged on a wall, "a direction perpendicular to an axis of the adjusting rod 22" described above is a direction parallel to a surface of the wall, and "an axial direction of the adjusting rod 22" described above is a direction perpendicular to the surface of the wall. In the case where the two adjacent boxes are arranged on a mounting frame, "a direction perpendicular to an axis of the adjusting rod 22" described above is a direction parallel to an outer surface of the mounting frame, and "an axial direction of the adjusting rod 22" described above is a direction perpendicular to the outer surface of the mounting frame.

Figure 1:
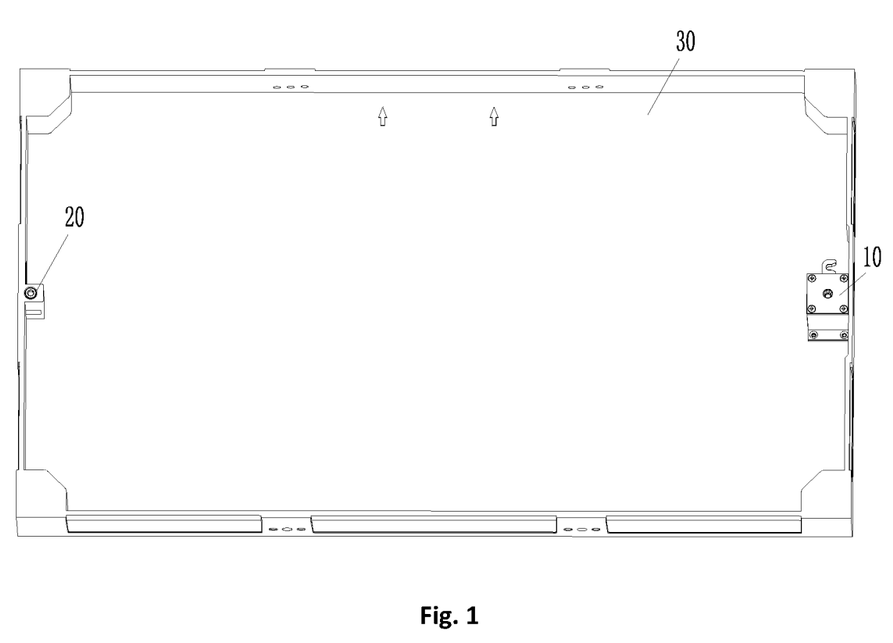
FIG. 1 shows a schematic diagram of a solid structure with an embodiment of an adjusting mechanism of a box of the disclosure arranged on a box.
Figure 2:
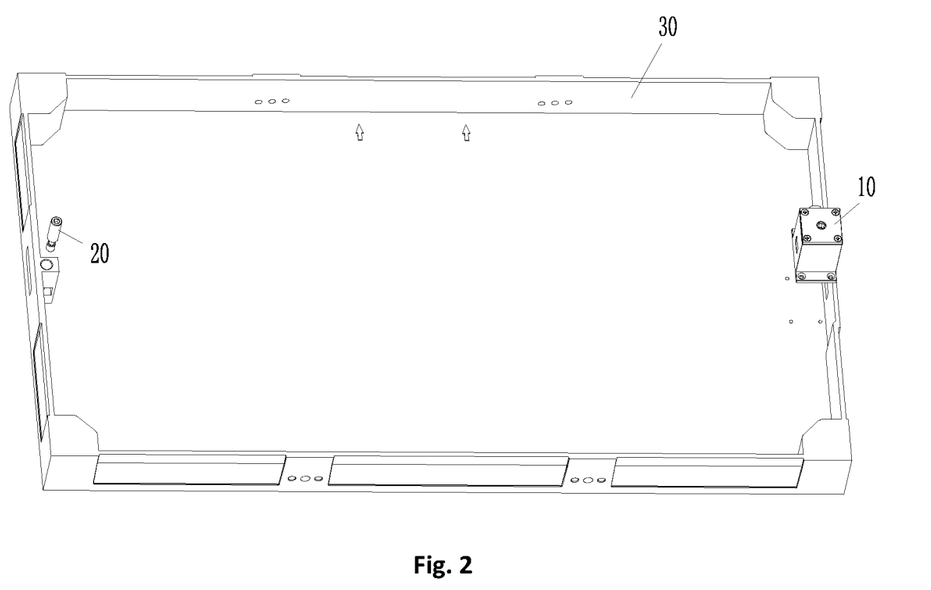
FIG. 2 shows a schematic diagram of a part of a breakdown structure of the adjusting mechanism of a box in FIG. 1.
Figure 3:
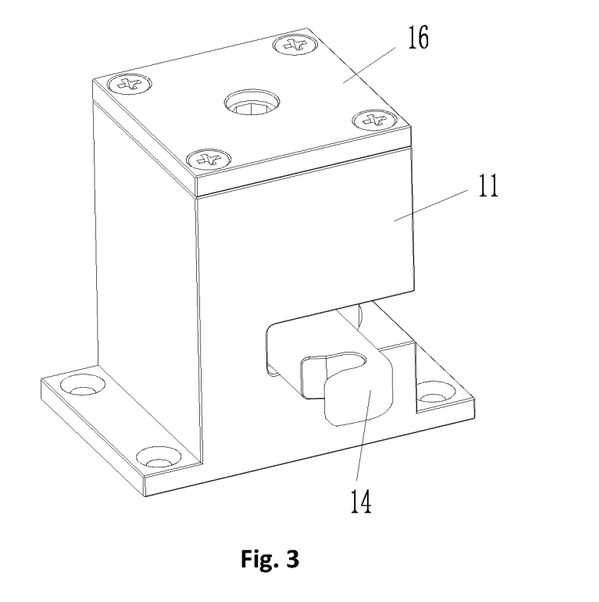
FIG. 3 shows a schematic diagram of a solid structure of a first adjusting structure in FIG. 1.
Figure 4:
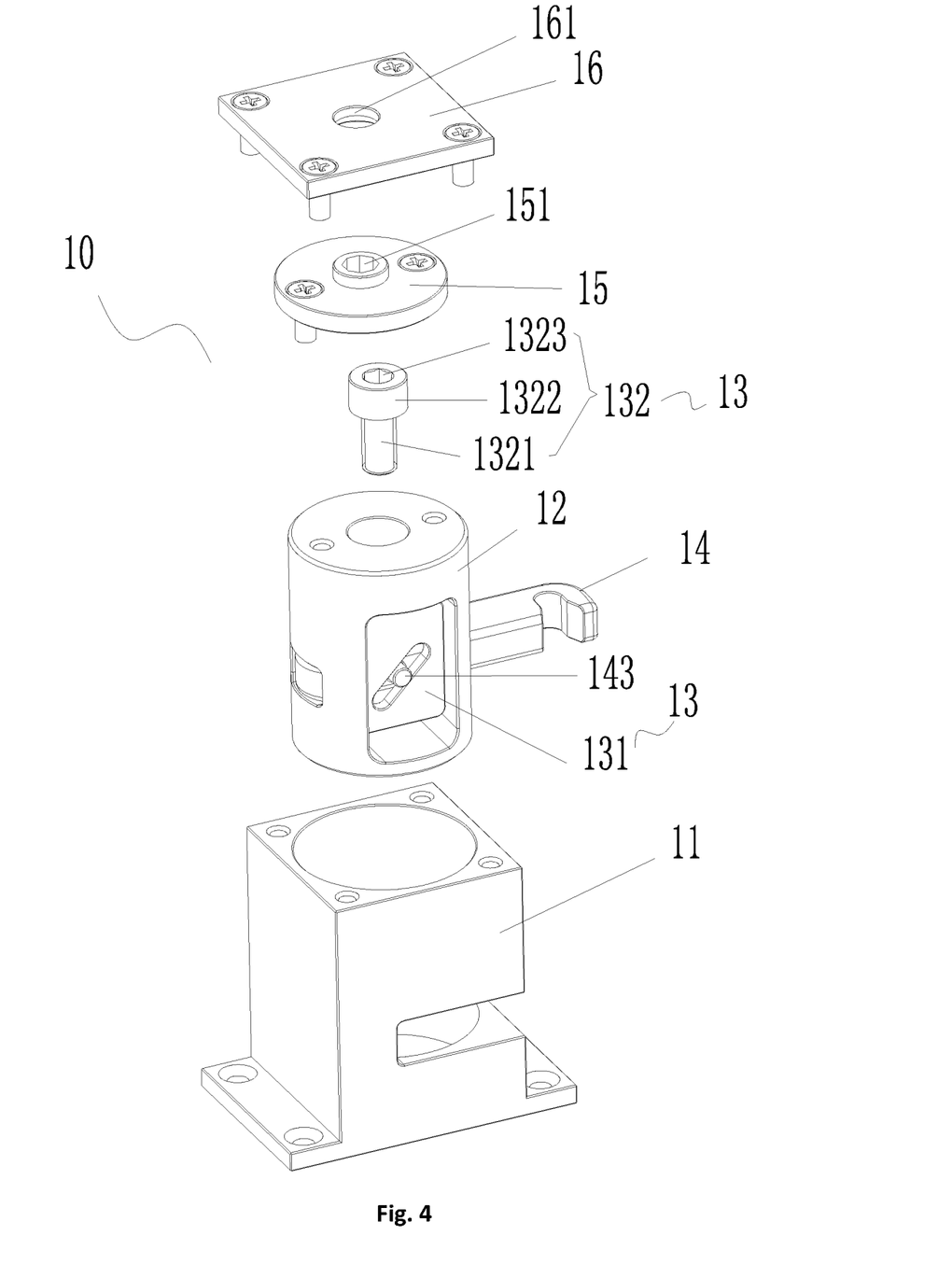
FIG. 4 shows a schematic diagram of a breakdown structure of the first adjusting structure in FIG. 3.
Figure 5:
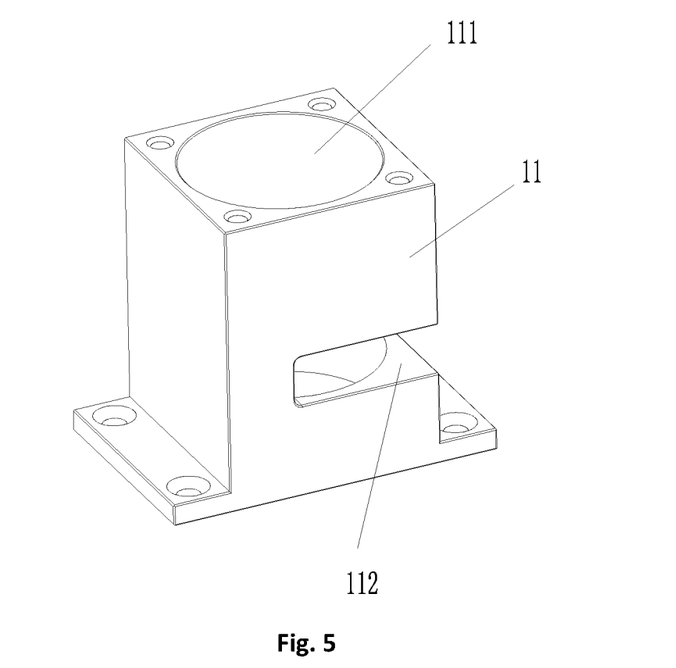
FIG. 5 shows a schematic diagram of a solid structure of a first base in FIG. 3.
Figure 6:
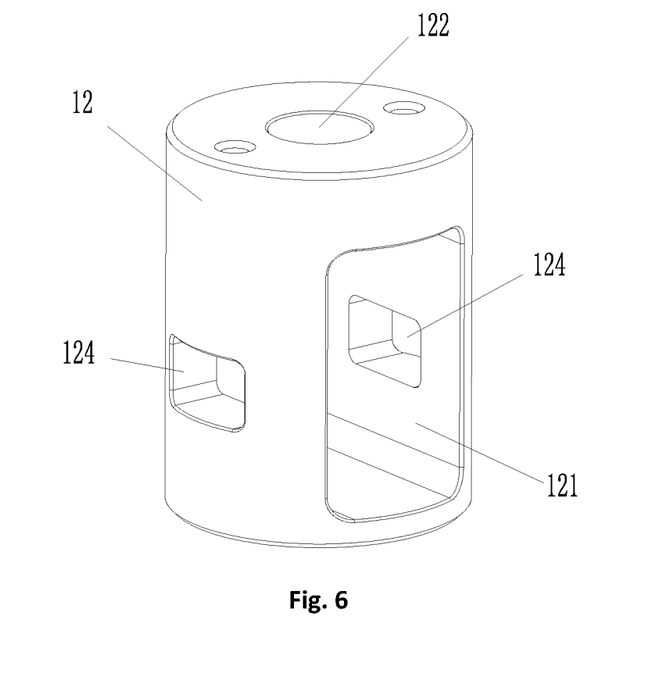
FIG. 6 shows a schematic diagram of a solid structure of a rotating member in FIG. 3.
Figure 7:
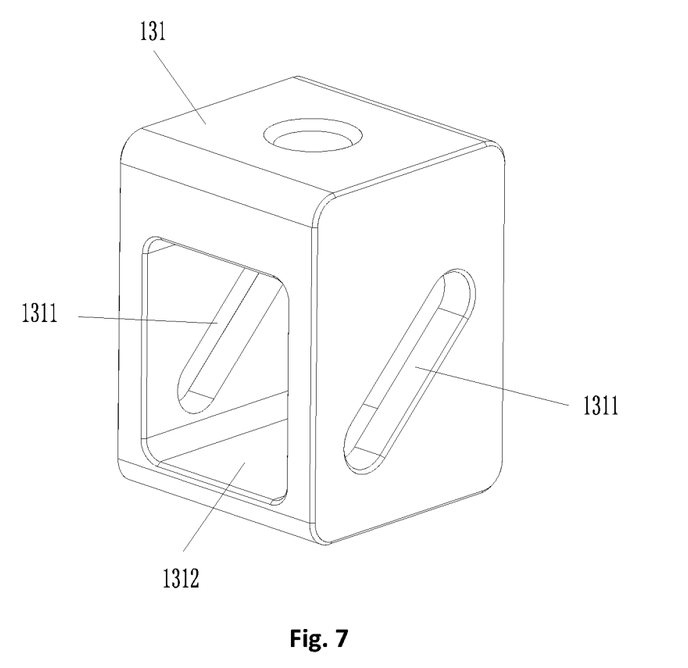
FIG. 7 shows a schematic diagram of a solid structure of a driving block in FIG. 3.
Figure 8:
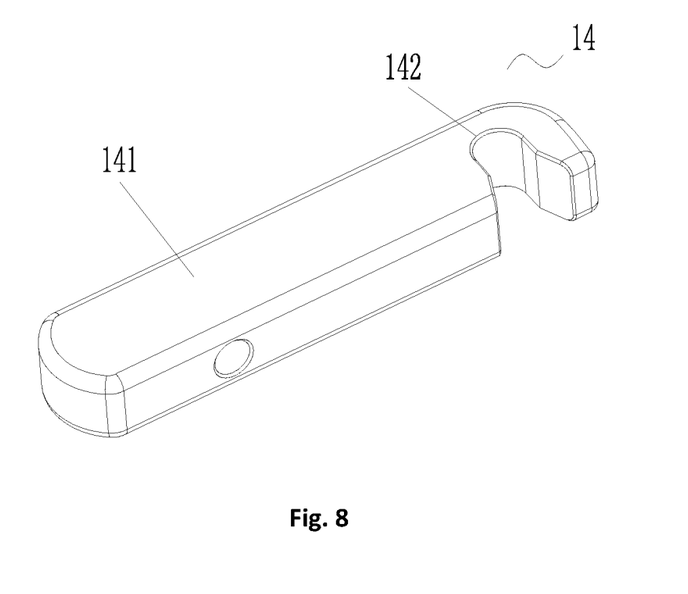
FIG. 8 shows a schematic diagram of a solid structure of an adjusting lock hook in FIG. 3.
Figure 9:
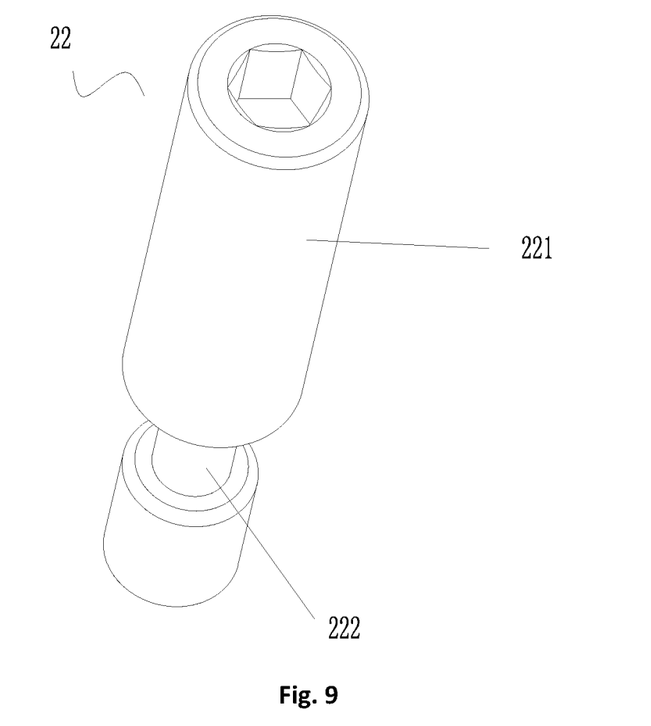
FIG. 9 shows a schematic diagram of a solid structure of an adjusting rod in FIG. 1.
Figure 10:
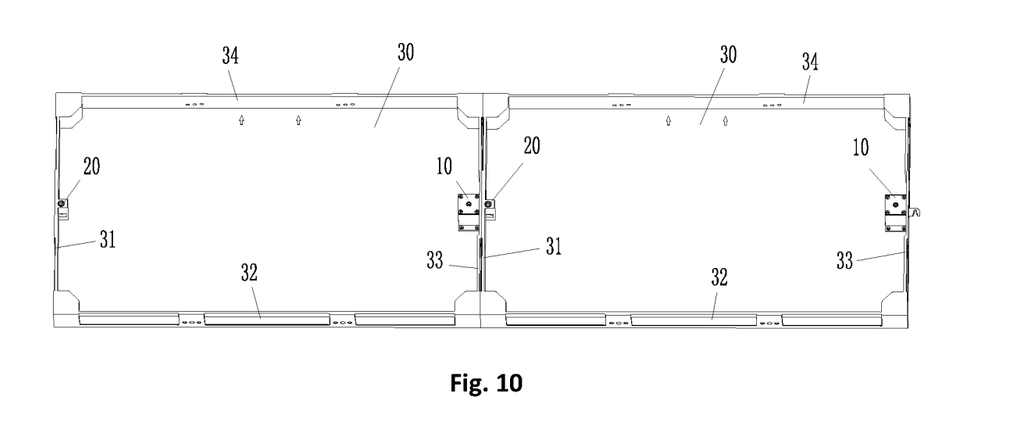
FIG. 10 shows a schematic diagram of a solid structure according to an embodiment of a light emitting diode (LED) box assembly of the disclosure.
Figure 11:
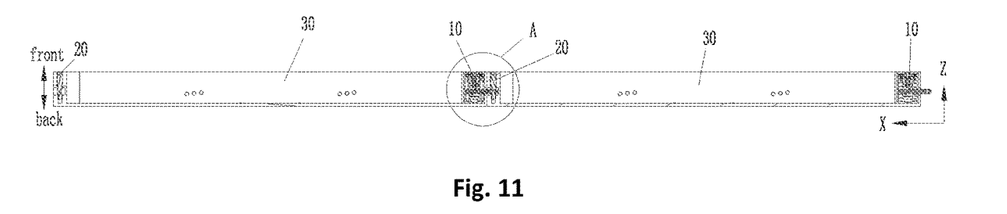
FIG. 11 shows a sectional schematic diagram in a front-back direction of the LED box assembly in FIG. 10.

As shown in FIGS. 4-7 and FIG. 12, a moving direction of the adjusting lock hook 14 is perpendicular to an axis of the rotating member 12, a moving direction of the adjusting rod 22 is parallel to the axis of the rotating member 12. The driving member 13 includes a driving block 131 and a driving rod 132. The rotating member 12 is internally provided with a guide groove 121, the driving block 131 is movably arranged in the guide groove 121, the driving rod 132 penetrates the rotating member 12 and drives, in a rotating manner, the driving block 131 to move, and an axis of the driving rod 132 is perpendicular to a moving direction of the adjusting lock hook 14. Through the provision of the guide groove 121 along the axis of the rotating member 12, the driving block 131 is conveniently move along a predetermined moving path in the rotating member 12, so as to play a guiding role. When the driving rod 132 rotates to penetrate the rotating member 12, the driving block 131 moves relative to the driving rod 132, and further the driving block 131 drives the adjusting lock hook 14 to move. It should be noted that "a moving direction of the adjusting lock hook 14" described above is perpendicular to the axis of the adjusting rod 22. That is, the axis of the driving rod 132 is parallel to the axis of the adjusting rod 22. When the driving rod 132 drives the driving block 131 to move, since a shape of the driving block 131 is able to prevent the driving block 131 from rotating in the guide groove 121, the driving block 131 is able to only move in the guide groove 121. The driving block 131 of the embodiment is preferably a rectangular block. The axis of the driving rod 132 and the axis of the adjusting rod 22 are both parallel to a front-back direction (a Z-axis direction shown in FIG. 11). A moving direction of the adjusting lock hook 14 is a left-right direction as shown in FIG. 11 (an X-axis direction shown in FIG. 11), and a moving direction of the adjusting lock hook 14 is left-right direction as shown in FIG. 13 (a X-axis direction shown in FIG. 13).

As shown in FIGS. 4-7 and FIG. 12, the driving block 131 is provided with a strip-shaped adjusting hole 1311. The adjusting lock hook 14 is provided with a connecting column 143 penetrating the strip-shaped adjusting hole 1311, and the strip-shaped adjusting hole 1311 is inclined relative to the moving direction of the adjusting lock hook 14. When moving, the driving block 131 drives the connecting column 143 positioned in the strip-shaped adjusting hole 1311 to move together, and further the driving block 131 drives the adjusting lock hook 14 to move. Through the provision of the strip-shaped adjusting hole 1311, a driving force, along the axis of the driving rod 132, for the driving block 131 may be converted into a driving force perpendicular to the axis of the driving rod 132. An inclined angle of the strip-shaped adjusting hole 1311 relative to the moving direction of the adjusting lock hook 14 is between 30 degrees and 80 degrees and preferably is 45 degrees, such that the adjusting lock hook 14 moves in an X-axis positive direction or an X-axis negative direction by equal distances, and operation is more convenient and faster.

As shown in FIGS. 4-7 and FIG. 12, the first base 11 is provided with a first mounting hole 111 and a first avoiding groove 112 in communication with the first mounting hole 111. The rotating member 12 is arranged in the first mounting hole 111, a side wall of the rotating member 12 is further provided with a guide hole 124 in communication with the guide groove 121, the driving block 131 is internally provided with a second avoiding groove 1312 in communication with the guide hole 124, and a part of the adjusting lock hook 14 penetrates the second avoiding groove 1312, the guide hole 124 and the first avoiding groove 112. Through the provision of the guide hole 124, the adjusting lock hook 14 is able to conveniently move along a predetermined moving path in the rotating member 12, so as to play a guiding role. Through the provision of the second avoiding groove 1312 and the first avoiding groove 112, a part of the adjusting lock hook 14 is positioned in the first adjusting structure 10 such that on the one hand, spaces in the boxes may be saved, and on the other hand, the first adjusting structure 10 may be more compact. Moreover, a part of the adjusting lock hook 14 does not interfere with the first base 11, the rotating member 12 and the driving block 131 during movement, and a part of the adjusting lock hook 14 does not interfere with the first base 11 during rotation.

As shown in FIGS. 4-7 and FIG. 12, the first adjusting structure 10 further includes an operating plate 15 connected with an end of the rotating member 12. The operating plate 15 is provided with a first operating hole 151, and a second operating hole 1323 is provided in an end, corresponding to the first operating hole 151, of the driving rod 132. When the first operating hole 151 is operated, the operating plate 15 rotates, and further the operating plate 15 drives the rotating member 12 to rotate in the first mounting hole 111. When the second operating hole 1323 is operated, the driving rod 132 rotates, and further the driving block 131 moves on the driving rod 132. Both the first operating hole 151 and the second operating hole 1323 in the embodiment are preferably hexagonal inner holes. It should be noted that a diameter of the second operating hole 1323 is smaller than a diameter of the first operating hole 151. When the second operating hole 1323 is operated, an operating tool do not contact with the first operating hole 151, the rotating member 12 do not rotate.

Figure 12:
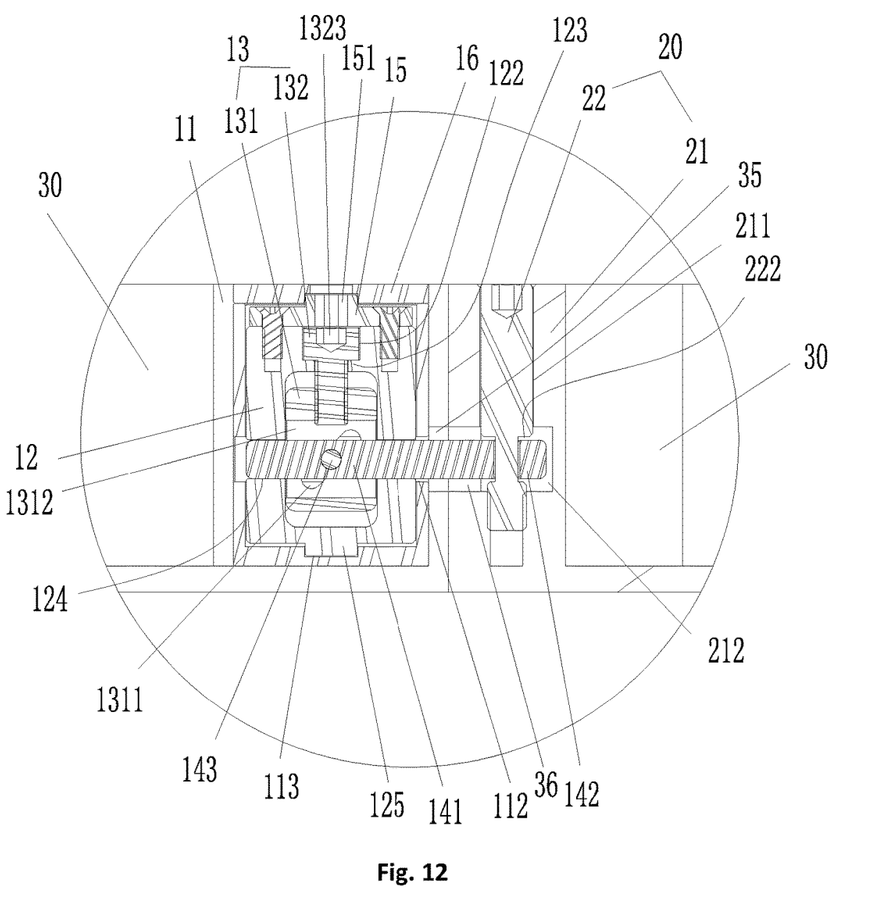
FIG. 12 shows an enlarged structural schematic diagram of portion A of the LED box assembly in FIG. 11.
Figure 13:
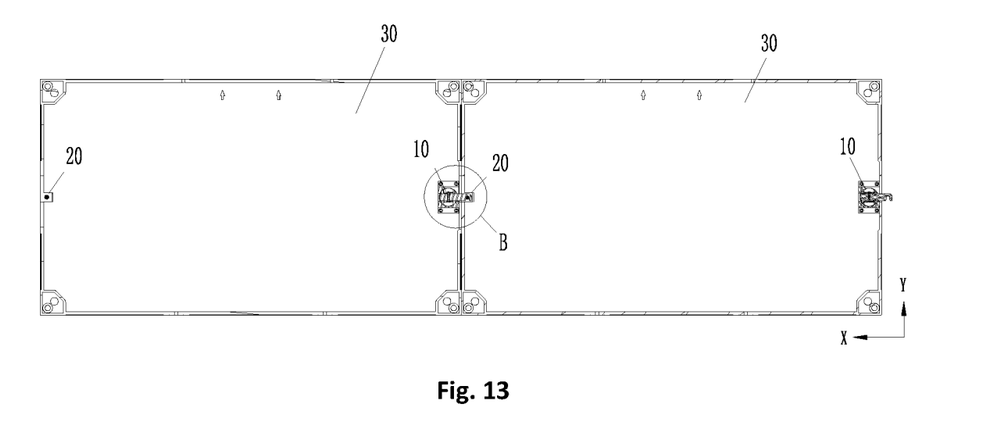
FIG. 13 shows a sectional schematic diagram in a left-right direction in the case where an adjusting lock hook of the LED box assembly in FIG. 10 is in a locking position.

As shown in FIG. 12, in the embodiment, in order to facilitate installation and improve installation efficiency, a positioning structure is arranged between the rotating member 12 and the first base 11. The positioning structure includes a positioning protrusion 125 arranged on the rotating member and a positioning recess 113 arranged on a wall of the first mounting hole 111 of the first base. The positioning protrusion 125 cooperates with the positioning recess 113, such that a structure is simple and installation is convenient. Moreover, when the rotating member 12 rotates in the first base 11, the positioning protrusion 125 may rotate in the positioning recess 113.

As shown in FIGS. 4-7 and FIG. 12, the rotating member 12 is further provided with a limiting hole 122 in communication with the guide groove 121. The driving rod 132 includes a connecting section 1321 positioned in the guide groove 121 and connected with the driving block 131, and an operating section 1322 connected with the connecting section 1321. A wall of the limiting hole 122 is provided with a limiting protrusion 123, the operating section 1322 is positioned in the limiting hole 122 and cooperates with the limiting protrusion 123 in a limited manner, and a second operating hole 1323 is provided on the operating section 1322. Through the arrangement of the connecting section 1321, on the one hand, rotation of the driving rod 132 may be transmitted such that the driving block 131 may move on the driving rod 132, and on the other hand, the driving block 131 may be hung in the guide groove 121. The operating section 1322 cooperates with the limiting protrusion 123 in a limited manner such that the operating section 1322 is able to only rotate in the limiting hole 122, so as to prevent the driving rod 132 from moving along an axis thereof. Specifically, the driving block 131 is in threaded connection to the connecting section 1321.

As shown in FIGS. 4-7 and FIG. 12, the adjusting mechanism of a box further includes a cover plate 16 covering the first base 11, and the cover plate 16 is provided with a first avoiding hole 161 in communication with the first operating hole 151. Through the arrangement of the cover plate 16, the operating plate 15 may be stopped, so as to prevent the rotating member 12 and the operating plate 15 from being separated from the first base 11, and meanwhile prevent dust outside the first adjusting structure 10 from entering the first mounting hole 111. Through the provision of the first avoiding hole 161, an operating tool (such as an Allen wrench) may be conveniently inserted into the first operating hole 151 or the second operating hole 1323.

In the embodiment, the adjusting mechanism of a box further includes a plurality of fasteners, and the first base 11 is fixed to a first box (see below) by the fasteners. The cover plate 16 is fixed to the first base 11 by the fasteners. The operating plate 15 is fixed to the end of the rotating member 12 by the fasteners. The second base 21 and a second box (see below) are integrally formed.

As shown in FIGS. 3-9 and FIG. 12, the adjusting lock hook 14 includes a driving section 141 and a lock hook section 142 connected with the driving section 141. The driving section 141 penetrates the driving member 13, the rotating member 12 and the first base 11. The lock hook section 142 is positioned outside the first base 11. The adjusting rod 22 includes a rod body 221 and a lock groove 222 provided on the rod body 221, where the adjusting lock hook 14 is in the locking position when the lock hook section 142 cooperates with the lock groove 222, and the adjusting lock hook 14 is in the unlocking position when the lock hook section 142 is separated from the lock groove 222. Through the arrangement of the driving section 141, the adjusting lock hook 14 is able to conveniently swing and move. Through the arrangement of the lock hook section 142, the adjusting lock hook 14 may conveniently carry out locking and unlocking. Furthermore, one adjusting lock hook 14 may realize multiple functions without addition of a plurality of screws such that complexity of operation by workers in field may be reduced. Through the cooperation between the lock groove 222 and the lock hook section 142, the adjusting lock hook 14 is able to be stably in the locking position. In the embodiment, an end of the rod body 221 is provided with a hexagonal inner hole.

As shown in FIGS. 11-16, the second base 21 is provided with a second mounting hole 211 and a third avoiding groove 212. The adjusting rod 22 is arranged in the second mounting hole 211, the lock groove 222 is positioned in the third avoiding groove 212, and the third avoiding groove 212 avoids the lock hook section 142. In this way, the third avoiding groove 212 avoids the lock hook section 142, such that the adjusting lock hook 14 is prevented from interfering with the second base 21 when rotating. Specifically, the adjusting rod 22 is arranged in the second mounting hole 211 by a threaded structure.

The disclosure further provides a light emitting diode (LED) box assembly. As shown in FIGS. 10-16, the LED box assembly of the embodiment includes a plurality of boxes 30 and an adjusting mechanism of a box, wherein the adjusting mechanism of a box is the above adjusting mechanism of a box. Since the above adjusting mechanism of a box can solve the problem that in the related art, only a gap between adjacent boxes can be adjusted, which makes a function relatively single, the LED box assembly including the adjusting mechanism of a box can solve the same technical problem.

As shown in FIGS. 10-16, the two boxes 30 are sequentially spliced, and two adjusting mechanisms of boxes are arranged. One box 30 of the two boxes 30 spliced left and right is a first box, and the other one is a second box. Each of the first box and the second box include a first side portion 31, a second side portion 32, a third side portion 33 and a fourth side portion 34 which are connected. The third side portion 33 of the first box is connected with the first side portion 31 of the second box by one adjusting mechanism of a box, the third side portion 33 of the first box is provided with a second avoiding hole 35 for avoiding the adjusting lock hook 14 of the adjusting mechanism of a box, and the first side portion 31 of the second box is provided with a third avoiding hole 36 for avoiding the adjusting lock hook 14 of the adjusting mechanism of a box. Through the provision of the second avoiding hole 35 and the third avoiding hole 36, the adjusting lock hook 14 can be conveniently penetrate, from the third side portion 33 of the first box, into an inside of the first side portion 31 of the second box.

Of course, in embodiments not shown in the figures, the number of the boxes may not be limited to two, but may be four, six or more.

In the embodiments not shown in the figures, one of two boxes spliced left and right is a first box and the other one is a second box. One of two boxes spliced up and down is a third box and the other one is a fourth box. Each of the first box, the second box, the third box and the fourth box includes a first side portion, a second side portion, a third side portion and a fourth side portion which are connected. The third side portion of the first box is connected with the first side portion of the second box by one adjusting mechanism of a box, the third side portion of the first box is provided with a second avoiding hole for avoiding the adjusting lock hook of the adjusting mechanism of a box, and the third side portion of the second box is provided with a third avoiding hole for avoiding the adjusting lock hook of the adjusting mechanism of a box. The second side portion of the third box is connected with the fourth side portion of the fourth box by another adjusting mechanism of a box, the second side portion of the third box is provided with a fourth avoiding hole for avoiding the adjusting lock hook of the adjusting mechanism of a box, and the fourth side portion of the fourth box is provided with a fifth avoiding hole for avoiding the adjusting lock hook of the adjusting mechanism of a box. Through the provision of the second avoiding hole and the third avoiding hole, an adjusting lock hook can be conveniently penetrate, from the third side portion of the first box, into an inside of the first side portion of the second box. Through the provision of the fourth avoiding hole and the fifth avoiding hole, the adjusting lock hook may be conveniently penetrate, from the second side portion of the third box, into an inside of the fourth side portion of the fourth box.

In the embodiment, the third side portion of the first box is connected with the first side portion of the second box by one adjusting mechanism of a box. The first operating hole 151 on the operating plate 15 is rotated by an Allen wrench, the operating plate 15 drives the rotating member 12 to rotate clockwise around the front-back direction (the Z-axis direction shown in FIG. 11) in the first mounting hole 111, then the adjusting lock hook 14 rotates around a Z-axis, and when the adjusting lock hook rotates by 90 degrees, the lock hook section 142 cooperates with the lock groove 222 to make the adjusting lock hook 14 in the locking position, thus the first box and the second box are fixedly connected.

The driving rod 132 on the first box is rotated clockwise or counterclockwise by an Allen wrench to drive the driving block 131 to move in the front-back direction (a Z-axis positive direction or a Z-axis negative direction shown in FIG. 11), thereby driving the adjusting lock hook 14 to move in the left-right direction (an X-axis positive direction or an X-axis negative direction shown in FIG. 11). By a pushing force or a pulling force, on the rod body 221 on the second box, of the lock hook section 142 of the adjusting lock hook 14 on the first box, the second box is driven to move in the left-right direction, and finally a gap between the first box and the second box in the left-right direction is adjusted.

The adjusting rod 22 on the second box is rotated clockwise or counterclockwise by an Allen wrench to move the adjusting rod 22 in the front-back direction (the Z-axis positive direction or the Z-axis negative direction). By the cooperation between the lock groove 222 on the adjusting rod 22 on the second box and the lock hook section 142 on the first box, the adjusting lock hook 14 on the first box is pushed or pulled to move in the front-back direction, such that the first box is driven to move in the front-back direction relative to the second box, and finally, a height difference between the first box and the second box in the front-back direction is adjusted.

In addition, the second side portion of the third box is connected with the fourth side portion of the fourth box by another adjusting mechanism of a box. The driving rod on the third box is rotated clockwise or counterclockwise by an Allen wrench to drive the driving block to move in the front-back direction (the Z-axis positive direction or the Z-axis negative direction shown in FIG. 11), such that the adjusting lock hook is driven to move in the up-down direction (a Y-axis positive direction or a Y-axis negative direction shown in FIG. 13). By a pushing force or a pulling force, on the rod body on the fourth box, of the lock hook section of the adjusting lock hook on the third box, the fourth box is driven to move in the up-down direction, and finally a gap between the third box and the fourth box in the up-down direction is adjusted.

In the description of the disclosure, it should be understood that orientation or positional relations indicated by orientation words such as "front", "back", "up", "down", "left", "right", "transverse", "vertical", "perpendicular to", "horizontal", "top" and "bottom" are generally based on orientation or positional relations shown in the accompanying drawings, and are for the convenience of describing the disclosure and simplifying the description only. Unless otherwise stated, these orientation words do not indicate or imply that devices or elements indicated thereby must have particular orientations or be constructed and operated in particular orientations and therefore may not be construed as limiting the protection scope of the disclosure. Orientation words "inside" and "outside" refer to an inside and an outside relative to an outline of each component.

For ease of description, spatial relative terms such as "over", "above", "on an upper surface" and "on" may be used herein to describe spatial positional relations of one device or feature with other devices or features as shown in the figures. It should be understood that the spatial relative terms are intended to include different orientations in use or operation in addition to the orientations of the devices described in the figures. For example, if the device in the accompanying drawings is inverted, the device described as "above" or "over" other devices or structures would then be positioned "below" or "under" the other devices or structures. Thus, the illustrative term "above" may include two orientations of "above" and "below." The device may also be positioned in other different ways (being rotated by 90 degrees or being positioned at other orientations) and the spatial relative description used herein is interpreted accordingly.

In addition, it should be noted that the use of words such as "first" and "second" to define parts is only for the purpose of conveniently distinguishing corresponding parts. Unless otherwise stated, the above words do not have special meanings, and therefore may not be understood as limiting the protection scope of the disclosure.

What is described above is only as preferred embodiments of the disclosure and is not intended to limit the disclosure, and for those skilled in the art, the disclosure may be variously modified and changed. Any modifications, equivalent replacements, improvements, etc. made within the spirit and principle of the disclosure should be included within the protection scope of the disclosure.

What is claimed is:

1. An adjusting mechanism of a box, comprising:
   a first adjusting structure which comprises a first base, a rotating member arranged on the first base, an adjusting lock hook movably arranged on the rotating member and a driving member arranged in the rotating member and configured to drive the adjusting lock hook to move, wherein the rotating member is able to drive the adjusting lock hook to rotate when rotating such that the adjusting lock hook has a locking position and an unlocking position; and
   a second adjusting structure which comprises a second base and an adjusting rod movably arranged in the second base, wherein the adjusting lock hook is in the locking position when the adjusting lock hook cooperates with the adjusting rod, and the adjusting lock hook is in the unlocking position when the adjusting lock hook is separated from the adjusting rod;
   wherein a moving direction of the adjusting lock hook is perpendicular to an axis of the rotating member, a moving direction of the adjusting rod is parallel to the axis of the rotating member; the driving member comprises a driving block and a driving rod, a guide groove is provided in the rotating member, the driving block is movably arranged in the guide groove along the axis of the rotating member, the driving rod penetrates the rotating member and drives in a rotating manner, the driving block to move, and an axis of the driving rod is perpendicular to a moving direction of the adjusting lock hook.

2. The adjusting mechanism of a box as claimed in claim 1, wherein the driving block is provided with a strip-shaped hole, the adjusting lock hook is provided with a connecting column penetrating the strip-shaped adjusting hole, and the strip-shaped adjusting hole is inclined relative to the moving direction of the adjusting lock hook.

3. The adjusting mechanism of a box as claimed in claim 1, wherein the first base is provided with a first mounting hole and a first avoiding groove in communication with the first mounting hole, the rotating member is arranged in the first mounting hold, a side wall of the rotating member is further provided with a guide hole in communication with the guide groove, the driving block is internally provided with a second avoiding groove in communication with the guide hole, and a part of the adjusting lock hook penetrates the second avoiding groove, the guide hole and the first avoiding groove.

4. The adjusting mechanism of a box as claimed in claim 1, wherein the first adjusting structure further comprises an operating plate connected with an end of the rotating member, wherein the operating plate is provided with a first operating hole, and a second operating hole is provided in an end, corresponding to the first operating hole, of the driving rod.

5. The adjusting mechanism of a box as claimed in claim 4, wherein the rotating member is further provided with a limiting hole in communication with the guide groove, the driving rod comprises a connecting section positioned in the guide groove and connected with the driving block and an operating section connected with the connecting section, a wall of the limiting hole is provided with a limiting protrusion, the operating section is positioned in the limiting hole and cooperates with the limiting protrusion in a limited manner, and the second operating hole is arranged on the operating section; a diameter of the second operating hole is smaller than a diameter of the first operating hole.

6. The adjusting mechanism of a box as claimed in claim 4, further comprising a cover plate covering the first base, and the cover plate is provided with a first avoiding hole in communication with the first operating hole.

7. The adjusting mechanism of a box as claimed in claim 1, wherein the adjusting lock hook comprises a driving section and a lock hook section connected with the driving section; the driving section penetrates the driving member, the rotating member and the first base, and the lock hook section is arranged outside the first base; and the adjusting rod comprises a rod body and a lock groove arranged on the rod body, wherein the adjusting lock hook is in the locking position when the lock hook section cooperates with the lock groove, and the adjusting lock hook is in the unlocking position when the lock hook section is separated from the lock groove.

8. The adjusting mechanism of a box as claimed in claim 7, wherein the second base is provided with a second mounting hole and a third avoiding groove, the adjusting rod is arranged in the second mounting hole, the lock groove is arranged in the third avoiding groove, and the third avoiding groove avoids the lock hook section.

9. A light emitting diode (LED) box assembly, comprising a plurality of boxes and the adjusting mechanism of a box as claimed in claim 1.

10. The LED box assembly as claimed in claim 9, wherein the plurality of boxes are sequentially spliced, and a plurality of adjusting mechanisms of boxes are arranged; one box of two boxes spliced left and right is a first box, the other one is a second box, and/or one box of two boxes spliced up and down is a third box, and the other one is a fourth box, wherein each of the first box, the second box, the third box and the fourth box comprises a first side portion, a second side portion, a third side portion and a fourth side portion which are sequentially connected;

wherein, the third side portion of the first box is connected with the first side portion of the second box by one adjusting mechanism of a box, the third side portion of the first box is provided with a second avoiding hole for avoiding the adjusting lock hook of the adjusting mechanism of a box, and the first side portion of the second box is provided with a third avoiding hole for avoiding the adjusting lock hook of the adjusting mechanism of a box; and the second side portion of the third box is connected with the fourth side portion of the fourth box by another adjusting mechanism of a box, the second side portion of the third box is provided with a fourth avoiding hole for avoiding the adjusting lock hook of the another adjusting mechanism of a box, and the fourth side portion of the fourth box is provided with a fifth avoiding hole for avoiding the adjusting lock hook of the another adjusting mechanism of a box.

11. The LED box assembly as claimed in claim 9, wherein a moving direction of the adjusting lock hook is perpendicular to an axis of the rotating member, a moving direction of the adjusting rod is parallel to the axis of the rotating member; the driving member comprises a driving block and a driving rod, a guide groove is provided in the rotating member, the driving block is movably arranged in the guide groove along the axis of the rotating member, the driving rod penetrates the rotating member and drives, in a rotating manner, the driving block to move, and an axis of the driving rod is perpendicular to a moving direction of the adjusting lock hook.

12. The LED box assembly as claimed in claim 11, wherein the driving block is provided with a strip-shaped adjusting hole, the adjusting lock hook is provided with a connecting column penetrating the strip-shaped adjusting hole, and the strip-shaped adjusting hole is inclined relative to the moving direction of the adjusting lock hook.

13. The LED box assembly as claimed in claim 11, wherein the first base is provided with a first mounting hole and a first avoiding groove in communication with the first mounting hole, the rotating member is arranged in the first mounting hole, a side wall of the rotating member is further provided with a guide hole in communication with the guide groove, the driving block is internally provided with a second avoiding groove in communication with the guide hole, and a part of the adjusting lock hook penetrates the second avoiding groove, the guide hole and the first avoiding groove.

14. The LED box assembly as claimed in claim 11, wherein the first adjusting structure further comprises an operating plate connected with an end of the rotating member, wherein the operating plate is provided with a first operating hole, and a second operating hole is provided in an end, corresponding to the first operating hole, of the driving rod.

15. The LED box assembly as claimed in claim 14, wherein the rotating member is further provided with a limiting hole in communication with the guide groove, the driving rod comprises a connecting section positioned in the guide groove and connected with the driving block and an operating section connected with the connecting section, a wall of the limiting hole is provided with a limiting protrusion, the operating section is positioned in the limiting hole and cooperates with the limiting protrusion in a limited manner, and the second operating hole is arranged on the operating section; a diameter of the second operating hole is smaller than a diameter of the first operating hole.

16. The LED box assembly as claimed in claim 14, further comprising a cover plate covering the first base, and the cover plate is provided with a first avoiding hole in communication with the first operating hole.

17. The LED box assembly as claimed in claim 9, wherein the adjusting lock hook comprises a driving section and a lock hook section connected with the driving section; the driving section penetrates the driving member, the rotating member and the first base, and the lock hook section is arranged outside the first base; and the adjusting rod comprises a rod body and a lock groove arranged on the rod body, wherein the adjusting lock hook is in the locking position when the lock hook section cooperates with the lock groove, and the adjusting lock hook is in the unlocking position when the lock hook section is separated from the lock groove.

18. The LED box assembly as claimed in claim 17, wherein the second base is provided with a second mounting hole and a third avoiding groove, the adjusting rod is arranged in the second mounting hole, the lock groove is arranged in the third avoiding groove, and the third avoiding groove avoids the lock hook section.

\* \* \* \* \*